United States Patent [19]
Nishioka et al.

[11] Patent Number: 4,707,105
[45] Date of Patent: Nov. 17, 1987

[54] APPARATUS FOR FIXING EXPOSURE AND FOCUS IN CAMERA

[75] Inventors: Sunao Nishioka, Tokyo; Mikio Takemae, Yokohama, both of Japan

[73] Assignee: Nippon Kagaku K. K., Tokyo, Japan

[21] Appl. No.: 932,800

[22] Filed: Nov. 20, 1986

[30] Foreign Application Priority Data

Dec. 2, 1985 [JP] Japan .............................. 60-271269

[51] Int. Cl.⁴ ............................................. G03B 7/00
[52] U.S. Cl. ...................................... 354/412; 354/486
[58] Field of Search ....................... 354/400, 412, 486

[56] References Cited

U.S. PATENT DOCUMENTS 4,295,715 10/1981 Breen .................................. 354/486
4,422,746 12/1983 Meguro et al. ..................... 354/195

Primary Examiner—L. T. Hix
Assistant Examiner—David M. Gray
Attorney, Agent, or Firm—Shapiro and Shapiro

[57] ABSTRACT

A camera is provided with an operation member for fixing one of the exposure data and the focusing position or both the exposure data and the focusing position, and a selector member for selecting one of the operations of the operation member.

5 Claims, 4 Drawing Figures

APPARATUS FOR FIXING EXPOSURE AND FOCUS IN CAMERA

BACKGROUND OF THE INVENTION

1. Field of the Invention

The present invention relates to an apparatus for fixing exposure and focus in a camera having automatic exposure control and automatic focus systems.

2. Related Background Art

In a conventional camera having an automatic exposure control system, an exposure fixing apparatus fixes exposure data for a specific composition. The exposure data includes a luminance value Bv, an exposure value Ev, a time value Tv, and an aperture Av. More specifically, the exposure fixing apparatuses are classified into two types according to the types of automatic exposure control systems. One exposure fixing apparatus, performs exposure fixing by inhibiting of storage data updating in an automatic exposure control system of a type wherein the time value Tv, the aperture value Av, or a combination thereof is derived from light metering results, and the time value Tv, the aperture value Av, or the combination thereof is sequentially stored. The other exposure fixing apparatus, performs exposure fixing by inhibiting of storage data updating in an automatic exposure control system of a type wherein the luminance value Bv or the exposure Ev is derived from the light metering results and sequentially stored, and exposure control is performed according to the stored luminance and exposure values Bv and Ev.

In a conventional camera with an automatic focusing system, a focusing fixing apparatus is a system which generally stops driving the lens at a given distance. Conventional automatic focusing systems are classified into two types: in one automatic focusing system, functions for detecting just-in-focusing vs. out-of-focusing and for displaying detection results are continuously effected; and in the other automatic focusing system, the above-mentioned functions are not performed (refer to U.S. Pat. No. 4,422,746).

Each of the exposure and focusing fixing apparatuses to be described in this specification may be any one of the types described above.

Exposure and focusing fixing apparatuses in a conventional single-lens reflex camera are respectively provided with a first operation button for fixing exposure data associated with the automatic exposure control system and a second operation button for fixing the focusing position controlled by the automatic focusing system. If a user wishes to simultaneously fix the exposure data and the focusing position, he must simultaneously depress the first and second operation buttons.

If the user wishes to fix both the exposure data and the focusing position to take pictures by using a camera with the conventional exposure and focusing fixing apparatuses, he must depress a release button while simultaneously depressing the first and second buttons. The depression operation is complicated so that photographing errors may occur.

SUMMARY OF THE INVENTION

The present invention has been made to solve the above problems, and has as its object to provide an apparatus for fixing exposure data and a focusing position with simple operations. In order to achieve the above object of the present invention, an apparatus according to the present invention is provided with an operation member for fixing one of the exposure data and the focusing position or both the exposure data and the focusing position, and a selector member for selecting one of the operations of the operation member.

DETAILED DESCRIPTION OF THE PREFERRED EMBODIMENTS

Figure 1:
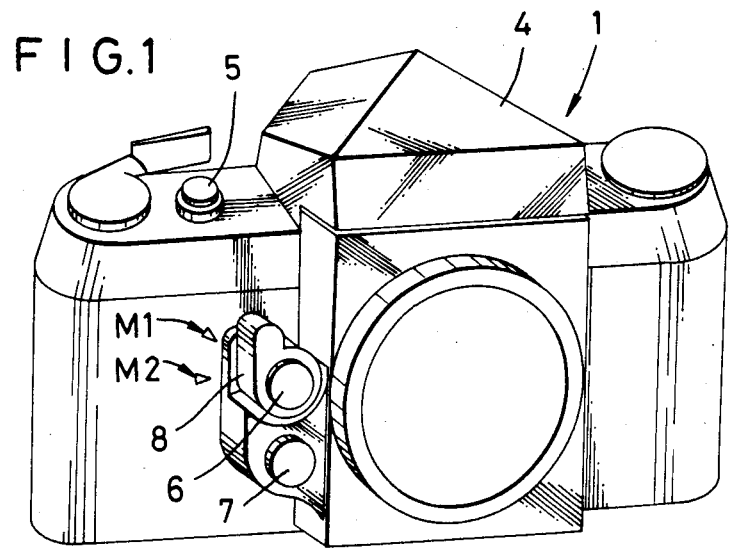
FIG. 1 is a perspective view of a single-lens reflex according to the present invention.
Figure 2:
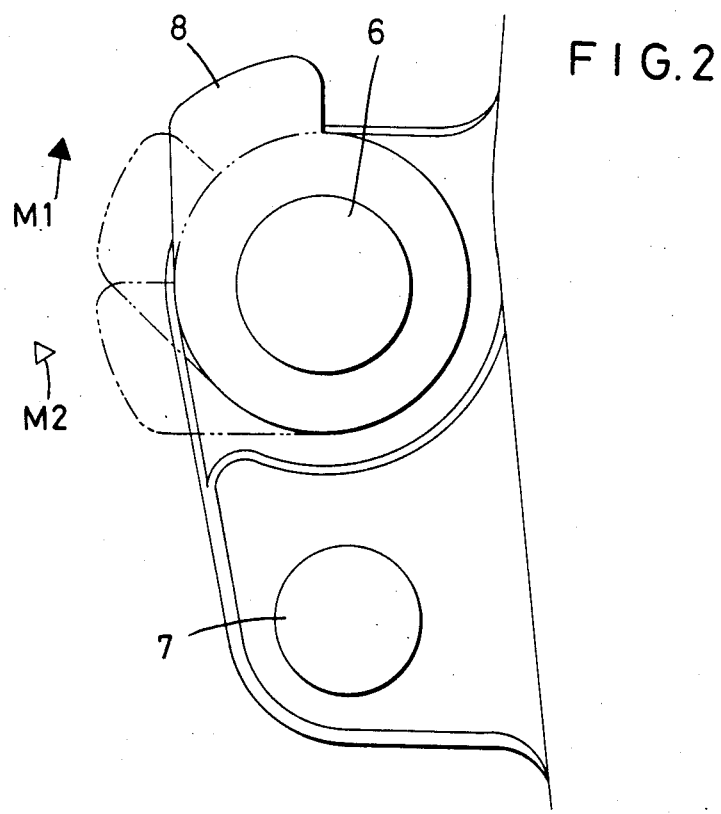
FIG. 2 is a schematic view showing part of a first embodiment according to the present invention.
Figure 3:
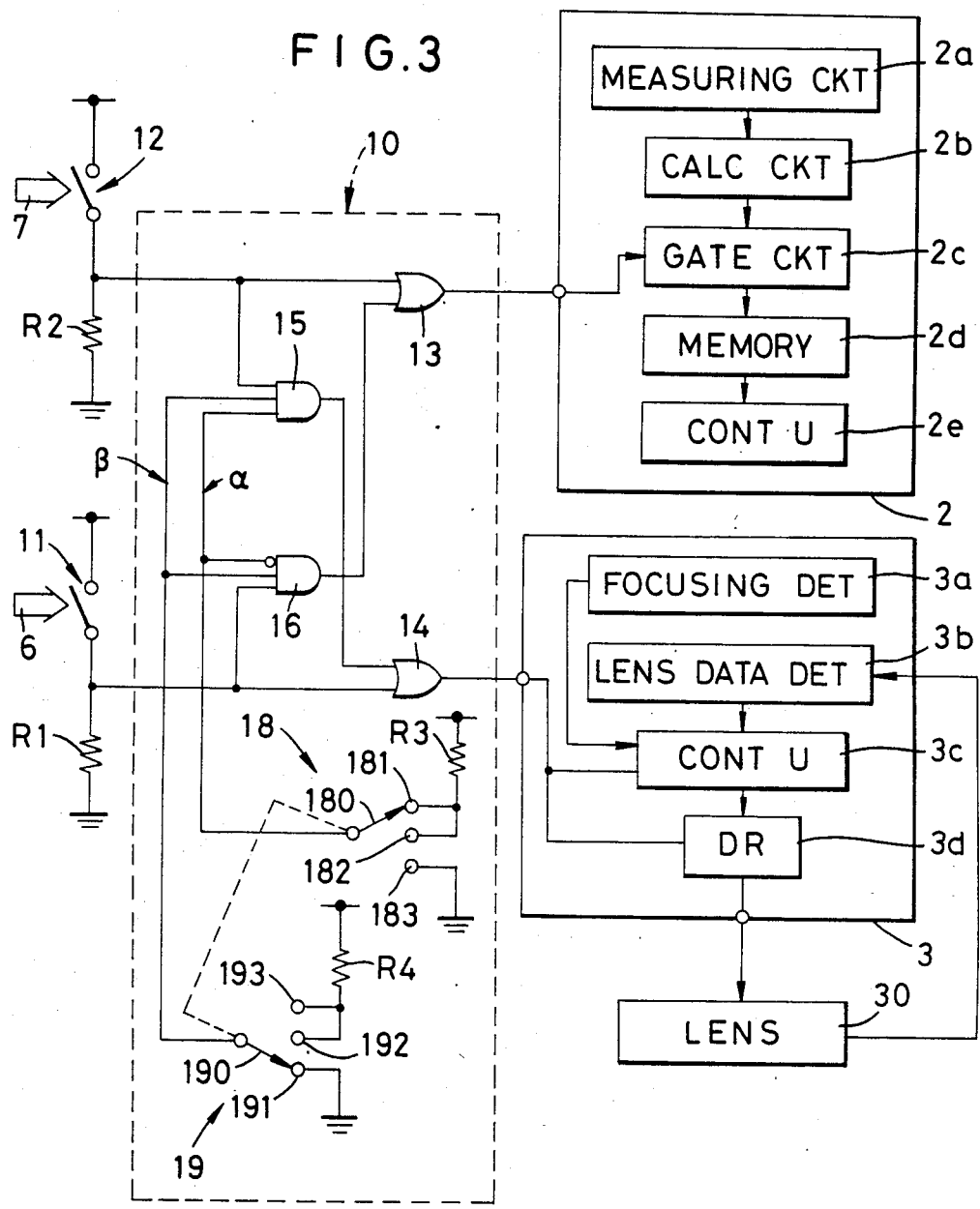
FIG. 3 is a block diagram showing the schematic arrangement of the first embodiment of the present invention.

FIGS. 1, 2 and 3 show a first embodiment of the present invention.

A single-lens reflex camera 1 in FIG. 1 is equipped with an automatic exposure control system and an automatic focusing system. In a block diagram of FIG. 3, controllers of the automatic exposure control and focusing systems are respectively represented by an exposure controller 2 and a focusing controller 3.

A release button 5 is arranged on the upper surface of a camera body 4, shown in FIG. 1. Pushbuttons 6 and 7 serving as the first and second operation members are vertically arranged on the front surface of the camera body 4. A selector member 8 can be located in a first position indicated by the solid line, and second and third positions respectively indicated by the alternate long and two short dashed lines. A mark M1 represents the second position of the selector member 8, and a mark M2 represents the third position thereof.

Referring to FIG. 3, there are illustrated the pushbuttons 6 and 7, and a fixing circuit 10 for fixing exposure data controlled by the exposure controller 2 and the focusing position controlled by the focusing controller 3 in response to operations of the pushbuttons 6 and 7.

Referring to FIG. 3, the fixing circuit 10 comprises a first switch 11 for turning on upon depression of the first pushbutton 6, a second switch 12 for turning on upon depression of the second pushbutton 7, OR gates 13 and 14, AND gates 15 and 16, and a selector switching unit 17 operated by the selector member 8.

The fixing circuit 10 is designed to select one of three modes upon switching of the selector member 8 to one of the first, second, and third positions. Upon operations of the pushbuttons 6 and 7, the fixing circuit 10 is operated in the selected mode in Table 1 as follows:

TABLE 1

| Mode | Operation |
| --- | --- |
| 1st Mode | Depression of pushbutton 6 |
| | ↓ |
| | Output of focusing position fixing signal |
| | Depression of pushbutton 7 |
| | ↓ |
| | Output of exposure data fixing signal |
| 2nd Mode | Depression of pushbutton 6 |
| | ↓ |
| | Output of focusing position fixing signal |
| | Depression of pushbutton 7 |
| | ↓ |
| | Outputs of focusing position and exposure data fixing signals |
| 3rd Mode | Depression of pushbutton 6 |
| | ↓ |

TABLE 1-continued

| Mode | Operation |
|---|---|
| | data fixing signals |
| | Depression of pushbutton 7 |
| | Output of exposure data fixing signal |

The one terminal of the first switch 11 is grounded through a resistor R1. One terminal of the second switch 12 is grounded through a resistor R2. The other terminal of each of the first and second switches 11 and 12 receives a predetermined positive voltage.

One input terminal of the OR gate 13 is connected to a connection point between the second switch 12 and the resistor R2. The other input terminal of the OR gate 13 is connected to the output terminal of the AND gate 16. The output terminal of the AND gate 16 is connected to the exposure controller 2.

In the exposure controller 2, exposure data (e.g., Ev) from a light metering circuit 2a and a calculation circuit 2b is stored in a memory 2d. A control unit 2e controls exposing on the basis of the exposure data read out from the memory 2d. In normal light metering, the exposure data in the memory 2d is sequentially updated. However, when a high level signal (to be referred to as an H level signal hereinafter) is input from the OR gate 13 to the exposure controller 2, a gate circuit 2c is enabled to inhibit updating of the exposure data, so that the storage contents of the memory 2d are fixed. While the signal is kept at H level, the exposure data is fixed at the value obtained at the time of signal input.

One input terminal of the OR gate 14 is connected to a connecting point between the first switch 11 and the resistor R1. The other input terminal of the OR gate 14 is connected to the output terminal of the AND gate 15. The output terminal or the OR gate 14 is connected to the focusing controller 3.

The focusing controller 3 comprises a focusing detector 3a, lens data detector 3b, a control unit 3c, and a lens driver 3d. A photographing lens 30 has a focusing lens. The lens data detector detects optical characteristics of the photographing lens 30 such as the current position of the focusing lens, an aperture value, and a focal distance. The control unit 3c calculates the signal from the focus detector 3a and the lens data detector 3b. The control unit 3c controls the lens driver 3d according to the result of the calculation. The lens driver 3d includes a lens drive motor for driving the focusing lens of the photographing lens 30.

When an H level signal from the OR gate 14 is input to the focusing controller 3, the focusing controller 3 stops control at the current focusing state and brakes the lens drive motor. The focusing lens is fixed in the focus state obtained at the time when the signal is input while the signal is kept at H level.

The selector switching unit 17 comprises first and second switches 18 and 19 interlocked with each other. The first switch 18 comprises a contact piece 180 and contacts 181 to 183. The proximal portion of the contact piece 180 is connected to one of the three input terminals of the AND gate 15 via a line α. At the same time, an output from the proximal portion of the contact piece 180 is inverted and the inverted signal is input to one of the three input terminals of the AND gate 16. The contacts 181 and 182 receive a predetermined potential through a resistor R3, and the contact 183 is grounded.

The second switch 19 comprises a contact piece 190 and contacts 191 to 193. The proximal end of the contact piece 190 is connected to one of the three input terminal of the AND gate 15 via a line β and to one of the three input terminals of the AND gate 16. The contact 191 is grounded, and the contacts 192 and 193 receive a predetermined potential through a resistor R4.

When the selector member 8 selects the first position, the contact pieces 180 and 190 are brought into contact with the contacts 181 and 191, respectively. However, when the selector member 8 selects the second position, the contact pieces 180 and 190 are brought into contact with the contacts 182 and 192. When the selector member 8 selects the third position, the contact pieces 180 and 190 are brought into contact with the contacts 183 and 193, respectively.

The remaining one of the three input terminals of the AND gate 15 is connected to the connecting point between the second switch 12 and the resistor R2. The remaining one of the three input terminals of the AND gate 16 is connected to the connecting point between the first switch 11 and the resistor R1.

The operation of the circuit arrangement described above will be described below.

(First Mode)

In order to set the fixing circuit 10 in the first mode in Table 1, the selector member 8 is set in the first position indicated by the solid line of FIG. 2. An H level voltage is applied to the line α, and the line β is grounded.

In the first mode as shown in Table 1, the focusing position is fixed upon depression of the first pushbutton 6. Upon depression of the second pushbutton 7, the exposure data is fixed.

More specifically, when the user depresses the pushbutton 6, the first switch 11 is turned on to supply an H level signal to the fixing circuit 10. An H level signal is supplied from the OR gate 14 to the focusing controller 3. At this time, the focusing position controlled by the focusing controller 3 is fixed. The H level potential on the line α is inverted to an L level signal, and this low level (to be referred to as an L level hereinafter) signal is input to one of the input terminals of the AND gate 16. The L level signal is supplied from the AND gate 16 to the OR gate 13. Therefore, the output from the OR gate 13 to the exposure controller 2 is set at L level. Therefore, exposure data is not fixed.

When the pushbutton 7 is depressed, the second switch 12 is turned on to supply an H level signal to the fixing circuit 10. The H level signal is supplied from the OR gate 13 to the exposure controller 2. The exposure data currently controlled by the exposure controller 2 is fixed while the pushbutton 7 is depressed. In this case, one of the input terminals of the AND gate 15 is grounded through the line β, and the L level signal is supplied from the AND gate 15 to the OR gate 14. An output from the OR gate 14 to the focusing controller 2 is set at L level. As a result, the focusing position is not fixed.

Upon simultaneous depression of the pushbuttons 6 and 7, both inputs to the fixing circuit 10 are set at H level, and thus both the exposure data and the focusing position are fixed.

(Second Mode)

In order to set the fixing circuit 10 in the second mode in Table 1, the selector member 8 is set at the second position indicated by the mark M1 in FIG. 2. In this mode, the H level voltage is applied to the lines α and β.

In the second mode, the focusing position is fixed upon operation of the first pushbutton 6, and both the exposure data and the focusing position are simultaneously fixed upon operation of the second pushbutton 7, as shown in Table 1.

More specifically, when the pushbutton 6 is depressed, the first switch 11 is turned on to supply the H level signal to the fixing circuit 10. The H level signal is supplied from the OR gate 14 to the focusing controller 3. The focusing position currently controlled by the focusing controller 3 is fixed while the pushbutton 6 is depressed. In the same manner as in the first mode, the H level voltage on the line α is inverted, and L level signal is supplied to one of the input terminals of the AND gate 16. The L level signal from the AND gate 16 is input to the OR gate 13. Therefore, the output from the OR gate 13 to the exposure controller 3 is set at L level. The exposure data is not fixed.

When the pushbutton 7 is depressed, the second switch 12 is turned on to supply the H level signal to the fixing circuit 10. The H level signal from the OR gate 13 is output to the exposure controller 2. The exposure value currently controlled by the exposure controller 2 is fixed. In this case, all inputs to the AND gate 15 are set at H level, and the output from the AND gate 15 is set at H level and is input to the OR gate 14. Therefore, the output from the OR gate 14 to the focusing controller 3 is set at H level, and thus both the exposure data and the focusing position are fixed.

Another operation method may be used in the second mode. More specifically, depression of only the first pushbutton 6 fixes the focusing position in advances. Then the pushbutton 6 is released after the second pushbutton 7 is depressed. In this state, the exposure data can be fixed while the focusing position is kept unchanged.

(Third Mode)

In order to set the fixing circuit 10 in the third mode in Table 1, the selector member 8 is set at the third position indicated by the mark M2 in FIG. 2. The line α is grounded, and the H level voltage is applied to the line β.

In the third mode, depression of the first pushbutton 6 allows fixing of both the exposure data and the focusing position. However, depression of the second pushbutton 7 allows fixing of the exposure data.

More specifically, when the pushbutton 6 is depressed, the first switch 11 is turned on to supply an H level signal to the fixing circuit 10. The H level signal from the OR gate 14 is supplied to the focusing controller 3. The focusing position currently controlled by the focusing controller 3 is fixed. In this case, an through the line α. The H level signal is thus input to the OR gate 13. The output from the OR gate 13 to the exposure controller 2 is set at H level, and thus both the exposure data and the focusing position are fixed.

When the pushbutton 7 is depressed, the second switch 12 is turned on to supply an H level signal to the fixing circuit 10. The H level signal from the OR gate 13 is output to the exposure controller 2. The exposure data currently controlled by the exposure controller 2 is fixed. In this case, one of the input terminals of the AND gate 15 is grounded through the line α. The output from the AND gate 15 is set at L level, and the L level signal is input to the OR gate 14. The output from the OR gate 14 to the focusing controller 3 is set at L level, and thus the focusing position is not fixed.

Another operation method may be used in the third mode. Depression of the second pushbutton 7 allows fixing of only the exposure data. Then the pushbutton 7 is released after when the first pushbutton 6 is depressed, the focusing position is also fixed while the exposure data is kept unchanged.

A second embodiment of the present invention will be described with reference to FIG. 4.

In the second embodiment, a selector, a selector member 80 is used in place of the selector member 8 of the first embodiment. The selector member 80 is switched between a first position indicated by the alternate long and two short dashed line of a mark M1 and a second position indicated by the alternate long and two short dashed line of a mark M2.

In the second embodiment, when the selector member 80 is located in the first position, the first mode in the first embodiment is selected. However, when the selector member 80 is located in the second position, the third mode of the first embodiment is selected. In this case, the operations of the fixing circuit 10 are summarized in Table 2.

TABLE 2

| Mode | Operation |
| --- | --- |
| 1st Mode | Depression of pushbutton 6<br>↓<br>Output of focusing position fixing signal<br>Depression of pushbutton 7<br>↓<br>Output of exposure data fixing signal |
| 2nd Mode | Depression of pushbutton 6<br>↓<br>Outputs of focusing position and exposure data fixing signals<br>Depression of pushbutton 7<br>↓<br>Output of exposure data fixing signal |

Figure 4:
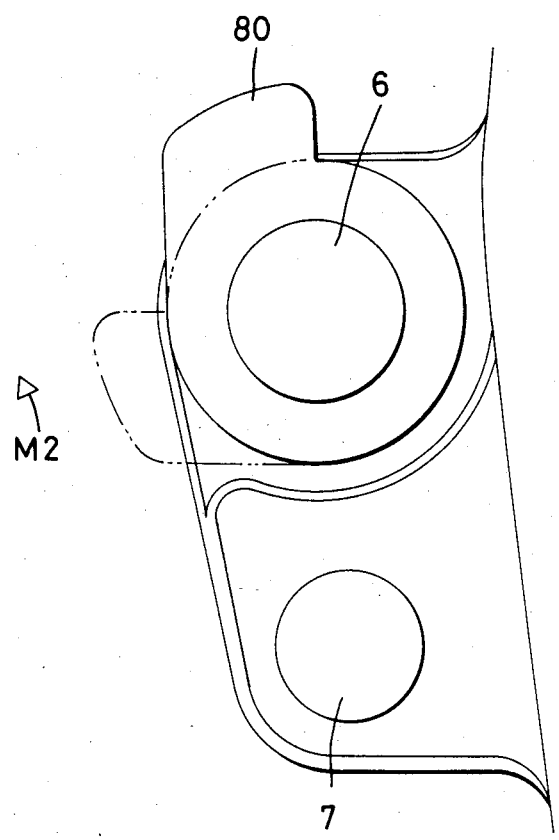
FIG. 4 is a schematic view showing part of a second embodiment according to the present invention.

In the second embodiment, if the selector member 80 is located in the first position of FIG. 4 to select the first mode, the focusing position is fixed upon operation of the first pushbutton 6. However, the exposure data is fixed upon operation of the second pushbutton 7.

If the selector member 80 is set at the position of the mark M2 in FIG. 4 to select the second mode, both the exposure data and the focusing position are fixed upon depression of the first pushbutton 6. However, only the exposure data is fixed upon operation of the second pushbutton 7.

In the second embodiment, when the selector member 80 is set in the first position, the first mode of the first embodiment is selected. When the selector member 80 is set in the second position, the second mode of the first embodiment may be selected. The fixing circuit in the second embodiment is simpler than that (FIG. 3) of the first embodiment. More specifically, only one AND gate and one OR gare are used (for example, the AND gate 15 and the OR gate 14 are omitted). The selector switch may be a single-throw two-contact switch.

In each of the first and second embodiments described above, the pushbutton switches 6 and 7 are arranged as the operation members. However, the present invention is not limited to such an arrangement. For example, only one operation member may be used. In this case, the operation of the operation member is switched by a selector member. Alternatively, members having the same operation may be located at a plurality of positions easily accessible to the operator.

In the above embodiment, the operation members are independently arranged. However, an identical operation may be performed by a certain state of another member in such a manner that, e.g., a release button is half depressed and kept at the half-depressed position.

In the above embodiment, the automatic exposure control system and the automatic focusing control system are independently constituted. However, these systems may be interlocked with each other or may be controlled by a central processing unit. The operations may be concentratedly controlled by a single microprocessor.

What is claimed is:

1. A camera comprising:
   (a) means for producing exposure data changing in response to a illuminance of an object to be photographed;
   (b) exposure control means including memory means for storing the exposure data and means for writing the exposure data in said memory means, said exposure control means being adapted to control an exposure according to the exposure data stored in said memory means;
   (c) means for producing focusing data changing in response to a distance to an object to be photographed;
   (d) focusing control means for controlling to move a focusing lens to a just-in-focus position according to the focusing data, said focusing control means being provided with driving means for driving said focusing lens;
   (e) first operating means adapted to be operated to generate a first input signal;
   (f) second operating means adapted to be operated to generate a second input signal;
   (g) fixing means, having first, second, and third modes, for generating a first fixing signal for inhibiting writing of the exposure data in said memory means and a second fixing signal for interrupting driving of said focusing lens by said driving means, said fixing means being adapted to generate the first fixing signal in response to the first input signal and the second fixing signal in response to the second input signal in the first mode, to generate the first fixing signal in response to the first input signal and the first and second fixing signals in response to the second input signal in the second mode, and to generate the first and second fixing signals in response to the first input signal and the second fixing signal in response to the second input signal in the third mode; and
   (h) selecting means for selecting one of the first, second, and third modes in response to the operation.

2. A camera comprising:
   (a) means for producing exposure data changing in response to a illuminance of an object to be photographed;
   (b) exposure control means including memory means for storing the exposure data and means for writing the exposure data in said memory means, said exposure control means being adapted to control an exposure according to the exposure data stored in said memory means;
   (c) means for producing focusing data changing in response to a distance to an object to be photographed;
   (d) focusing control means for controlling to move a focusing lens to a just-in-focus position according to the focusing data, said focusing control means being provided with driving means for driving said focusing lens;
   (e) first operating means adapted to be operated to generate a first input signal;
   (f) second operating means adapted to be operated to generate a second input signal;
   (g) fixing means, having first and second modes, for generating a first fixing signal for inhibiting writing, of the exposure data into said memory means and a second fixing signal for interrupting driving of said lens by said driving means, said fixing means being adapted to generate the first fixing signal in response to the first input signal and the second fixing signal in response to the second input signal in the first mode and to generate the first and second fixing signals in response to one of the first and second input signals and one of the first and second fixing signals in response to the other of the first and second input signals in the second mode; and
   (h) selecting means for selecting one of the first and second modes of said fixing means in response to the operation.

3. A camera according to Claim 2, wherein said fixing means generates the first fixing signal in response to the first input signal and the first and second fixing signals in response to the second input signal in the second mode.

4. A camera according to Claim 2, wherein said fixing means generates the first and second fixing signals in response to the first signal and the second fixing signal in response to the second input signal in the second mode.

5. A camera comprising:
   (a) exposure control means for controlling an exposure according to exposure data changing in response to an illuminance of an object to be photographed;
   (b) focusing control means for controlling shifting of a focusing optical system to a just-in-focus state according to data changing in response to a distance to an object to be photographed;
   (c) operating means adapted to be operated;
   (d) fixing means for generating a first fixing signal for causing said exposure control means to fix the exposure data and a second fixing signal for causing said focusing control means to fix the state of said focusing optical system, said fixing means being provided with a mode for generating the first and second fixing signals in response to the operation of said operating means and a mode for generating one of the first and second fixing signals in response to the operation of said operating means; and
   (e) selecting means for selecting one of a plurality of modes of said fixing means in response to the operation.

* * * * *